Figure 1:
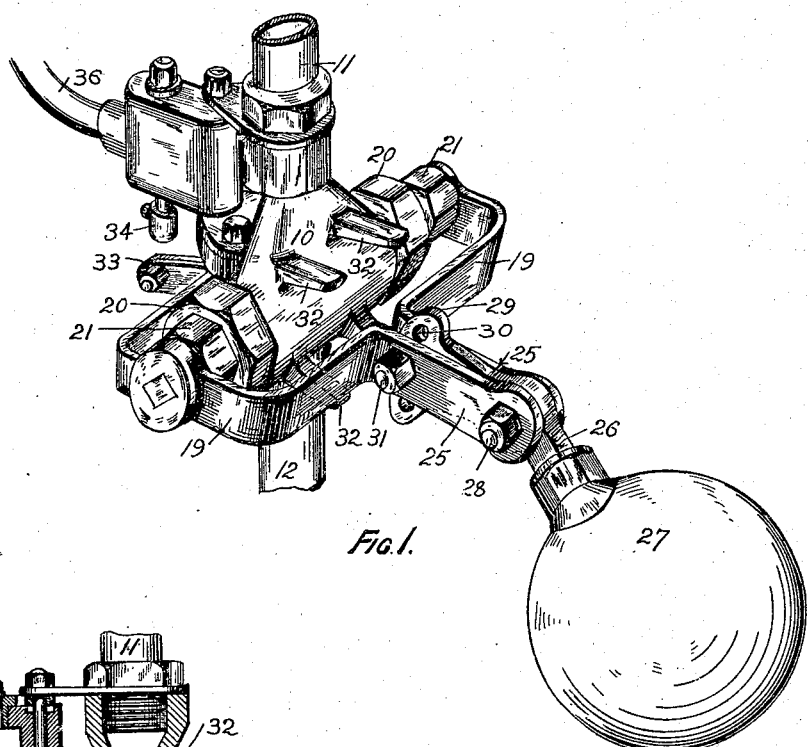

J. N. ELLIS.
BOILER FEED ADMISSION VALVE.
APPLICATION FILED FEB. 2, 1915.

1,188,535.

Patented June 27, 1916.
2 SHEETS—SHEET 1.

J. N. ELLIS.
BOILER FEED ADMISSION VALVE.
APPLICATION FILED FEB. 2, 1915.

1,188,535.

Patented June 27, 1916.
2 SHEETS—SHEET 2.

UNITED STATES PATENT OFFICE.

JULIUS NELSON ELLIS, OF CANONBURY GROVE, DULWICH HILL, NEW SOUTH WALES, AUSTRALIA.

BOILER FEED-ADMISSION VALVE.

1,188,535.   Specification of Letters Patent.   Patented June 27, 1916.

Application filed February 2, 1915. Serial No. 5,799.

*To all whom it may concern:*

Be it known that I, JULIUS NELSON ELLIS, a subject of the King of Great Britain and Ireland, residing at Thea, Canonbury Grove, Dulwich Hill, in the State of New South Wales, Commonwealth of Australia, have invented certain new and useful Improvements in Boiler Feed-Admission Valves, of which the following is a specification.

This invention relates to appliances comprising a float operated valve positioned on the water feed pipe within the boiler or within a drum or casing connected therewith.

The invention consists of a valve of plug type operated by a float and characterized in that the plug is parallel and the inlet port to the plug aperture is in the form of an elongated parallelogram its major axis lying axially with the plug and its minor axis circumferentially of the plug, and the fluid passage in the plug is of similar elongated form, so that comparatively slight angular movement of the float arm is sufficient to completely open or close the valve. In one form the plug is cylindrical at each end, and in the center a segment is cut away at one or both sides leaving a bar connecting the cylindrical ends and one face of which constitutes the port-closing element. This construction permits of the admission port being almost closed while the exit port is still open thus eliminating restriction of the water in the plug itself. In an alternative form affording the same clearance for the water, the plug is ported, the port on its admission side being an elongated parallelogram corresponding to the port in the valve casing and merging at the exit side into a wide (circumferentially) and shorter (axially) port. The advantages of this form of plug are as follows:—(*a*) it works more freely particularly when subjected to heat, (*b*) it is less likely to stick, (*c*) packing glands may be used at each end with less likelihood of jamming the plug, (*d*) with packing glands at the ends to prevent escape of water into the steam space of the boiler and (at high temperatures) resulting explosive reports the plug may be comparatively free in the casing. To eliminate risk of rupture of the feed pipe above the valve I provide a small channel around the plug to permit slight leakage affording relief for any expansion of water in the said pipe.

The invention is devised particularly for use in conjunction with the appliance forming the subject of my application for Letters Patent of the United States of America, Serial Number 803150, filed 26th November, 1913, which is for regulating the steam supply to a feed-pump or injector and which would in the case of a connected range of boilers necessitate a separate pump or injector for each boiler in order that any of them may not receive an undue proportion of feed water. With the present invention this necessity is obviated as no matter from what source the feed water is derived the appliance will admit only sufficient to maintain the water in the boiler at or about the proper working level.

I will now refer to the accompanying drawings illustrating practical construction of the appliance and in which:—

Figure 2:
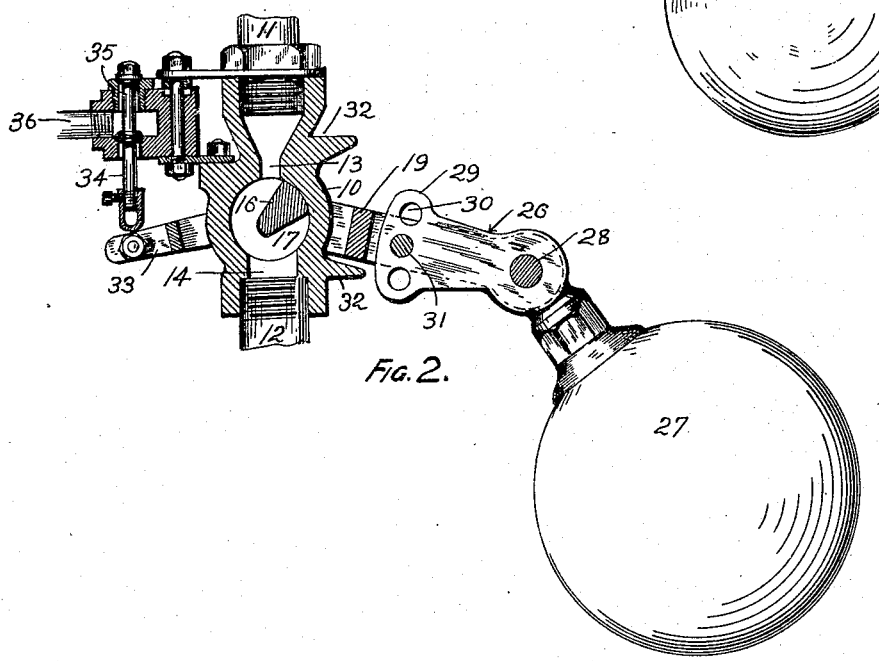
Figure 3:
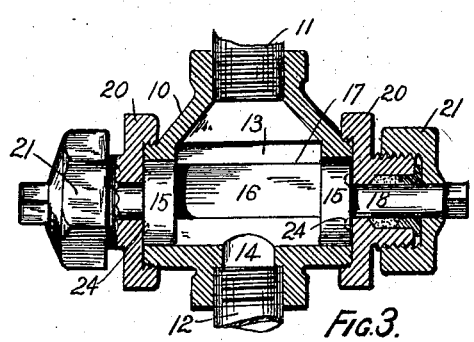
Figure 4:
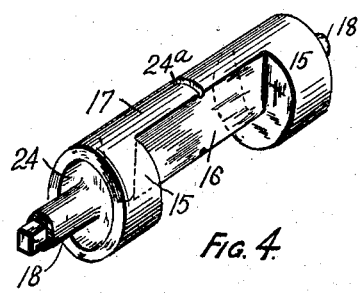
Figure 5:
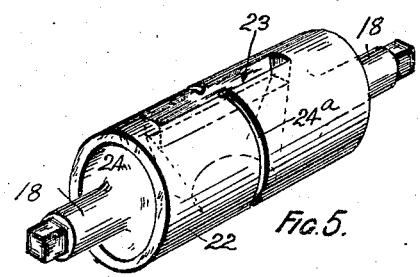
Figure 6:
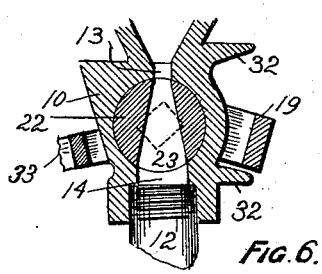
Figure 7:
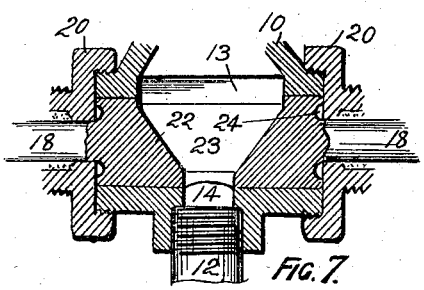

Figure 1 is a perspective external view of the appliance fitted with whistle valve to give audible warning of low water should the feed supply fail from any reason. Fig. 2 is a vertical sectional elevation thereof showing the cut away type of plug in the "valve-open" position. Fig. 3 is a longitudinal section through the plug. Fig. 4 is a perspective view of the type of plug referred to. Fig. 5 is a similar view of the ported plug. Fig. 6 is a part sectional elevation showing the ported plug in the casing and in the "valve-open" position. Fig. 7 is a part longitudinal section through the ported plug.

The casing 10 is inserted between the two sections 11 and 12 of the feed water pipe and on reference to Figs. 2 and 6 it will be seen that the admission port 13 is narrow circumferentially of the plug and on reference to Figs. 3 and 7 is comparatively very long axially, while the exit port 14 is circular.

The plug (Figs. 2 to 4 inclusive) consists of two end-portions 15. 15. of equal diameter connected by a bar 16 the peripheral arc 17 of which is of equal radius to the end portions and constitutes the port-closing element. At each end of the plug is a trunnion 18 having a squared end for engagement by the yoke 19, and each of said trunnions passes through a stuffing box 20 screwed on to the end of the casing 10 and through a gland 21. In Figs. 5, 6 and 7 the plug 22 has a port 23, at one end an elongated parallelogram similar to port 13 of the casing and merging at the other end into the circular form to match port 14 of the casing. This plug is also provided with trunnions 18 and the casing with packing glands as before described. The end faces of the plug (of either type) are recessed as at 24 to reduce the area of the surfaces in contact with the opposing faces of the stuffing boxes 20. To eliminate the risk of trapping water in the feed pipe and rupture of the latter by expansion of said entrapped water I may provide in either form of plug a small leakage groove 24$^a$ which insures escape of water. It is unnecessary that a valve of this type should be absolutely tight fitting.

The yoke 19 is in two parts and between the corresponding front cranked ends 25 thereof the lever 26 carrying the float 27 is pivoted at 28. Said lever has a substantially T head 29 having a series of holes 30 through either of which the bolt 31 may be passed. This construction affords facility for adjusting the vertical position of the float 27. The movement of the yoke 19 is limited by permanent stops 32 projecting from the valve casing. On the opposite side of the casing the cranked ends 33 of the yoke constitute an arm which when the float falls so far as to bring the plug to a position beyond that giving a full port opening, will contact with and raise the stem 34 of a valve such as 35 and by opening the same permit steam to pass through pipe 36 to an alarm whistle (not shown).

What I claim and desire to secure by Letters Patent is:—

A boiler feed regulator comprising a casing provided with inlet and outlet ports, a valve, within, and controlling the flow of fluid through the casing, said valve being provided with trunnions adapted to project through and extend beyond the casing, means, comprising a yoke, formed in two sections, engaging said trunnions, each of said sections being substantially crank shaped and being provided with an opening through the body thereof near the front end, a lever pivoted, intermediate its two extremities, between the correspondingly cranked front end of the yoke, a float, secured to one of the ends of the lever, the other end thereof being formed with a T head, provided with a plurality of openings therethrough, said openings being adapted to register with the openings formed through the body of the yoke, and means adapted to be passed through the said openings of the yoke, and the openings formed through the T head to prevent movement of one relative to the other, and thereby provides vertical adjustment for the float.

Signed at Sydney, New South Wales, Australia, this fifteenth day of December, A. D. 1914.

JULIUS NELSON ELLIS.

Witnesses:
WM. NEWTON,
EMILY P. BARNETT.

Copies of this patent may be obtained for five cents each, by addressing the "Commissioner of Patents, Washington, D. C."